US008868730B2

(12) United States Patent
Rossignoli

(10) Patent No.: US 8,868,730 B2
(45) Date of Patent: Oct. 21, 2014

(54) METHODS OF MANAGING LOADS ON A PLURALITY OF SECONDARY DATA SERVERS WHOSE WORKFLOWS ARE CONTROLLED BY A PRIMARY CONTROL SERVER

(75) Inventor: James M. Rossignoli, Cambridge (CA)

(73) Assignee: NCR Corporation, Duluth, GA (US)

( * ) Notice: Subject to any disclaimer, the term of this patent is extended or adjusted under 35 U.S.C. 154(b) by 327 days.

(21) Appl. No.: 13/044,031

(22) Filed: Mar. 9, 2011

(65) Prior Publication Data

US 2012/0233309 A1 Sep. 13, 2012

(51) Int. Cl.
*G06F 15/173* (2006.01)
*G06F 9/50* (2006.01)

(52) U.S. Cl.
CPC .................................. *G06F 9/505* (2013.01)
USPC ........... 709/224; 709/203; 709/202; 709/226; 709/217; 709/220; 707/823

(58) Field of Classification Search
USPC ................. 709/224, 203, 217, 226, 220, 204; 707/823
See application file for complete search history.

(56) References Cited

U.S. PATENT DOCUMENTS

| 7,739,388 B2 * | 6/2010 | Wood ............................ 709/226 |
| 2002/0055980 A1 * | 5/2002 | Goddard ....................... 709/217 |
| 2004/0088412 A1 * | 5/2004 | John et al. ..................... 709/226 |
| 2006/0277278 A1 * | 12/2006 | Hegde et al. .................. 709/220 |
| 2009/0106354 A1 * | 4/2009 | Ui et al. ........................ 709/203 |
| 2009/0113056 A1 * | 4/2009 | Tameshige et al. ........... 709/226 |
| 2009/0248755 A1 * | 10/2009 | Watanabe et al. ............. 707/202 |
| 2010/0115008 A1 * | 5/2010 | Nakatani et al. .............. 707/823 |
| 2010/0125656 A1 * | 5/2010 | Karasaridis et al. .......... 709/224 |
| 2011/0047215 A1 * | 2/2011 | Guo et al. ..................... 709/204 |
| 2012/0254300 A1 * | 10/2012 | Rai et al. ...................... 709/203 |

* cited by examiner

*Primary Examiner* — Thuong Nguyen
(74) *Attorney, Agent, or Firm* — Michael Chan; Harden Stevens, III

(57) ABSTRACT

A method is provided of managing workflow loads on a plurality of secondary data servers whose workflows are controlled by a primary control server. The method comprises initially directing workflow to only an active first data server of the plurality of secondary data servers, monitoring at least one server capacity factor associated with the active first data server, after a first predetermined minimum load level of work to the active first data server has been reached, continue directing work to only the active first data server until a first predetermined maximum load level of work to the active first data server is reached, determining if a minimum load level of work can be maintained on an idle second data server of the plurality of secondary data servers based upon the monitored capacity factor associated with the active first data server, and directing workflow to the idle second data server when a determination is made that the minimum load level of work can be maintained on the idle second data server.

11 Claims, 5 Drawing Sheets

50

LIST OF SOME SERVER CAPACITY TO PROCESS WORK FACTORS

- SIZE OF A WORK QUEUE
- RATE AT WHICH WORK IN A WORK QUEUE IS BEING COMPLETED
- CPU UTILIZATION
- DISK CAPACITY
- DETECTION OF A SERVER OUTAGE
- TYPICAL DAILY MAXIMUM WORK VOLUME EXPECTED
- PRESENCE (OR ABSENCE) OF A MAINTENANCE REQUEST
- APPLICATION-SPECIFIC SERVICE TO BE PERFORMED

FIG. 3

METHODS OF MANAGING LOADS ON A PLURALITY OF SECONDARY DATA SERVERS WHOSE WORKFLOWS ARE CONTROLLED BY A PRIMARY CONTROL SERVER

TECHNICAL FIELD

This present invention relates to operation of secondary data servers, and is particularly directed to methods of managing loads on a plurality of secondary data servers whose workflows are controlled by a primary control server.

BACKGROUND

There are numerous known applications in which a primary control server operates to control a plurality of secondary data servers. In some known applications, enormous amounts of data are captured by the secondary data servers, and at some point need to be purged. In these known applications, some amount of application downtime is needed during routine maintenance so that data can be purged from the secondary data servers. The amount of downtime needed during routine maintenance is specific to the particular application.

A check processing system is one known type of application in which enormous amounts of data are captured by the secondary data servers, and therefore subsequently need to be purged. The data purging process requires the entire check processing system to be taken offline for some period of time. During this downtime, a financial institution (such as a bank) running the check processing system cannot process any financial transaction. Financial transactions to be processed will form a queue until the data purging process has been completed, and the check processing system goes back online and becomes available again to process financial transactions.

A check processing system is an example of a mission-critical application in which a goal is to have system availability to as near 100% of the time as possible. A check processing system is also an example of a complex application in which the primary control server provides many global controls over the secondary data servers, and in which there is much workflow and other complicated interactions between the secondary data servers themselves. Such complexity makes it difficult to purge data from the secondary data servers without having to take the check processing system offline for at least some period of time. It would be desirable to provide methods of managing loads on secondary data servers of mission-critical applications (such as check processing systems) so that routine maintenance (such as purging of data from secondary data servers) can be performed without having to take these systems offline at all.

SUMMARY

In accordance with one embodiment of the present invention, a method is provided of managing workflow loads on a plurality of secondary data servers whose workflows are controlled by a primary control server. The method comprises initially directing workflow to only an active first data server of the plurality of secondary data servers, and monitoring at least one server capacity factor associated with the active first data server. After a first predetermined minimum load level of work to the active first data server has been reached, work continues to be directed to only the active first data server until a first predetermined maximum load level of work to the active first data server is reached. A determination is made if a minimum load level of work can be maintained on an idle second data server of the plurality of secondary data servers based upon the monitored capacity factor associated with the active first data server. Workflow is directed to the idle second data server when a determination is made that the minimum load level of work can be maintained on the idle second data server.

BRIEF DESCRIPTION OF THE DRAWINGS

The present invention may take form in various components and arrangement of components and in various methods. The drawings are only for purposes of illustrating example embodiments and alternatives and are not to be construed as limiting the invention.

FIG. 3 is a list of server capacity to process work factors which may be associated with each of the secondary data servers shown in FIGS. 1 and 2.

DETAILED DESCRIPTION

This present invention relates to operation of secondary data servers, and is particularly directed to methods of managing loads on a plurality of secondary data servers whose workflows are controlled by a primary control server.

Figure 1:
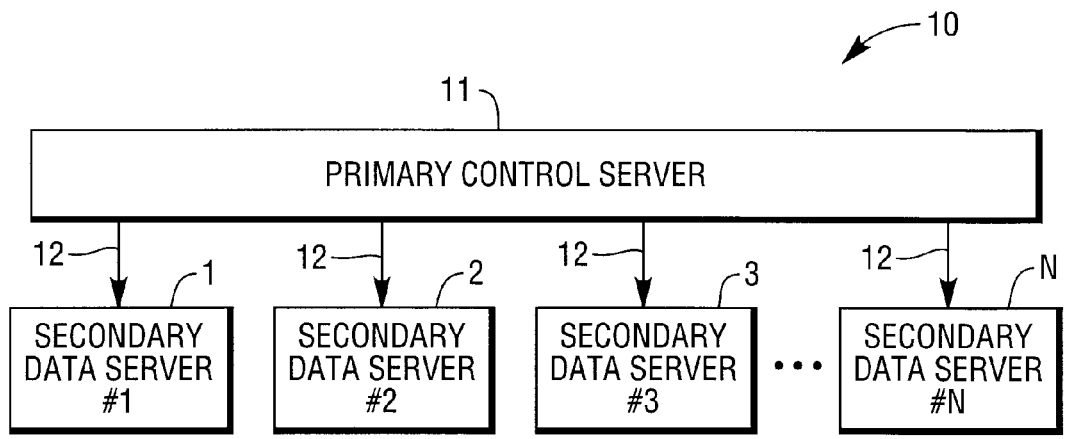
FIG. 1 is a block diagram of a mission-critical system comprising a plurality of secondary data servers whose workflows are controlled by a primary control server.

Referring to FIG. 1, a server-based system 10 comprises a primary control server 12 and a plurality of second data servers which are designated with reference numerals 1, 2, 3 ... N where "N" is an integer greater than three. Although only four secondary data servers are shown in FIG. 1, it is conceivable that only two data servers be shown, or that more than four data servers be shown. Each of secondary data servers 1, 2, 3 ... N and the primary control server 11 may be any computer with sufficient hardware and software resources to act as a server. As an example, the computer may comprise any type of electronic processor or controller with sufficient storage memory which stores operating system software and/or executable application-specific software.

Each of secondary data servers 1, 2, 3 ... N electronically communicates with primary control server 11 via a high speed data communication network 12. The network 12 may be a wide area computer network (WAN) or other communication network. The WAN may be a closed network. The WAN may also be an open network, such as the Internet, that provides a public communication network. The primary control server 11 controls workflow of the data servers 1, 2, 3 ... N.

The server-based system 10 is typically a mission-critical application in which a goal is to have system availability (i.e., not halted or brought down) to as near 100% of the time as possible. An example of a mission-critical server-based application is a check processing system in which document items such as bank checks are processed. One example of a check processing system is a Transaction Manager system available from NCR Corporation located in Duluth, Ga. Transaction Manager system includes a base application server (which corresponds to the primary control server 11 shown in FIG. 1). Transaction Manager system also comprises a number of data servers (which corresponds to the secondary data servers 1, 2, 3 . . . N shown in FIG. 1). Structure and operation of data servers and the base application server in a check processing system (such as NCR's Transaction Manager system) are known and, therefore, will not be described.

Figure 2:
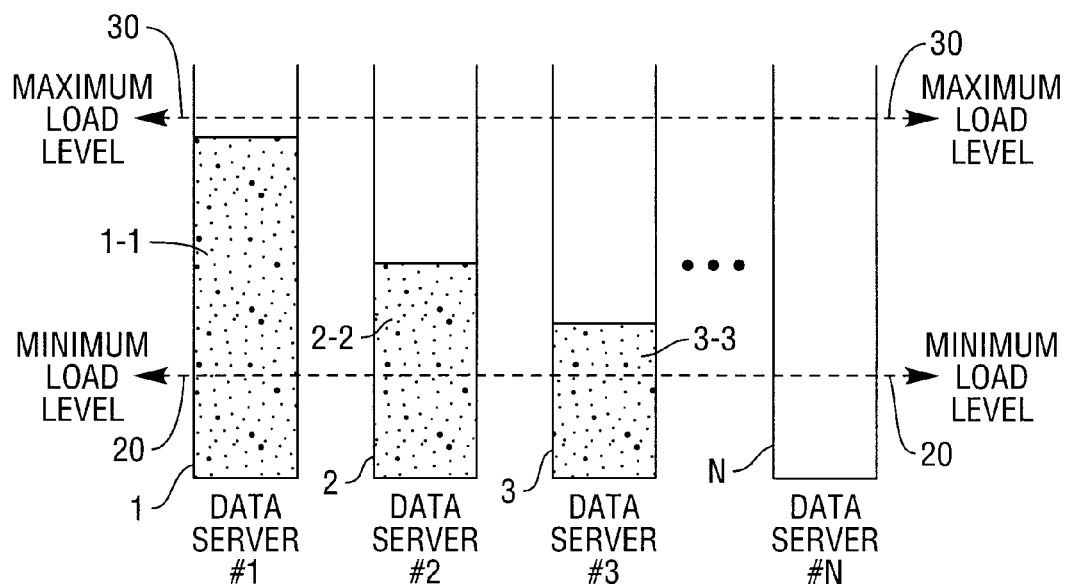
FIG. 2 is a schematic diagram of the plurality of secondary data servers of FIG. 1, and showing a minimum load level and a maximum load level associated with each of the secondary data servers.

A schematic diagram which illustrates certain features of the data servers 1, 2, 3 . . . N is shown in FIG. 2. Each of the data servers 1, 2, 3 . . . N has a minimum load level and a maximum load level associated therewith. As shown in FIG. 2, the minimum load level is indicated with reference numeral 20, and the maximum load level is indicated with reference numeral 30. Although only one minimum load level is shown in FIG. 2 as being associated with all of the data servers 1, 2, 3 . . . N, it is conceivable that each of the data servers may have its own unique minimal load level associated therewith. Similarly, although only one maximum load level is shown in FIG. 2 as being associated with all of the data servers 1, 2, 3 . . . N, it is conceivable that each of the data servers may have its own unique maximum load level associated therewith. For simplicity, the following description will describe each of the data servers 1, 2, 3 . . . N having the same minimum load level 20 and the same maximum load level 30 associated therewith.

During operation of the system 10, each of the data servers 1, 2, 3 . . . N shown in FIG. 2 has a capacity to process work at any given moment in time. For example, as shown in FIG. 2, shaded area 1-1 represents the capacity of data server 1 to process work. Similarly, shaded area 2-2 represents the capacity of data server 2 to process work, and shaded area 3-3 represents the capacity of data server 3 to process work. It should be apparent that the capacity of data server 1 to process work is shown just below the maximum load level 30, the capacity of data server 2 to process work is shown about half-way between the maximum load level 30 and the minimum load level 20, and that the capacity of data server 3 process work is shown just above the minimum load level 20. Since there is no shaded area associated with data server N shown in FIG. 2, this represents that data server N has no capacity to process work (i.e., all of the capacity of data server N is unused) at the particular moment in time.

Each of the data servers 1, 2, 3 . . . N has similar structure, operation, and capacity to process work. For simplicity, structure, operation, and capacity to process work of only data server 1 will be described in detail where applicable. The capacity of a data server to process work relies upon a number of factors.

One factor which can affect capacity of a data server to process work may include server processing rate. Server processing rate depends upon work queue size and rate at which work in the queue is being completed. Server processing rate of a data server can be used to determine when to engage another data server (such as when work arrival rates are increasing), or when to disengage a particular data server (such as when work arrival rates are decreasing).

Another factor which can affect capacity of a data server to process work may include server availability. Server availability depends upon central processor unit (CPU) utilization associated with the particular data server, disk capacity associated with the particular data server, and detection of server outage conditions, for examples. Server availability can be used to determine when to immediately stop feeding new work to a particular data server or when to resume feeding new work to the particular data server.

Yet another factor which can affect capacity of a data server to process work may include typical daily maximum work volume expected to be performed. This factor can be used to intelligently select which one(s) of the data servers 1, 2, 3 . . . N to ramp up in processing work, and which one(s) of the data servers 1, 2, 3 . . . N to ramp down in processing work so that all of the data servers are available and have disk capacity during peak hours of operation of the system 10.

Still another factor which can affect capacity of a data server to process work may include presence of (or absence of) a maintenance request. This factor can be used to intelligently stop feeding work to selected data servers and shift their work loads to other data servers so that maintenance (e.g., purging of data) can be performed on the selected data servers. After maintenance has been performed on the selected data servers, work loads can be shifted back to them so that other data servers can be ramped down to perform maintenance on these other data servers.

Another factor which can affect capacity of a data server to process work may include application-specific conditions. This factor may relate to a condition specific to an application and can factor into usage of a particular data server. As an example, if a service running on a particular data server is known to take a relatively lengthy time to complete, and the particular data server has many requests in its queue, then additional requests can be routed to an alternate data server even though a determination is made that the particular data server has enough remaining capacity to run the service and to process the requests that are in its queue. By directing the additional requests away from the particular data server and re-routing these requests to the alternate data server, the queue time for requests on the particular data server will shorten.

The above description describes only some factors which may affect capacity of data server 1 to process work. The factors described hereinabove are summarized in list 50 shown in FIG. 3. Other factors not listed in the list 50 of FIG. 3 also may affect capacity of a data server to process work. It is conceivable that any combination of other factors and the factors listed in the list 50 of FIG. 3 may affect capacity of a data server to process work.

Figure 4:
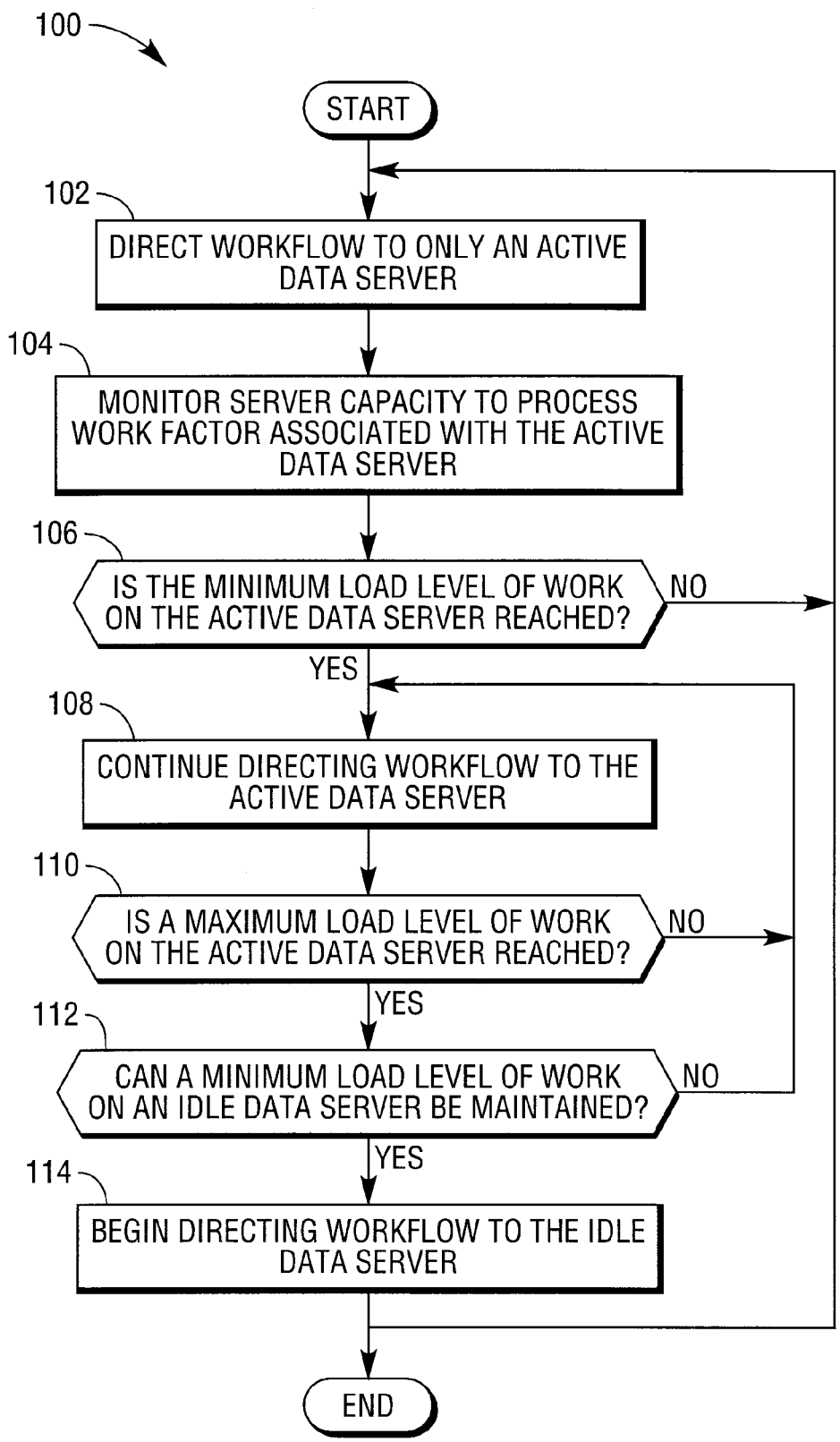
FIG. 4 depicts a flow diagram of one embodiment of a method which may be implemented by the system of FIG. 1.

Referring to FIG. 4, a flow diagram 100 depicts one embodiment of a first method which may be implemented by the system 10 of FIG. 1. This first method is based upon the minimum and maximum load levels 20, 30 shown in FIG. 1 and at least some of the factors shown in the list 50 of FIG. 3, as will be described in detail hereinbelow.

During operation of system 10 of FIG. 1, workflow is directed to only an active one of the data servers 1, 2, 3 . . . N (step 102). For simplicity and purposes of explanation, it will be assumed that data server 1 is initially the only active data server. At least one capacity to process work factor associated with data server 1 is monitored (step 104).

As workflow is directed to active data server 1, a determination is made as to whether the minimum load level 20 associated with the active data server 1 is reached (step 106). If determination in step 106 is negative (i.e., the minimum load level 20 of data server 1 has not been reached), the method returns back to step 102 to continue directing workflow to data server 1. However, if determination in step 106 is affirmative (i.e., the minimum load level 20 of data server 1 has been reached), the method proceeds to step 108 in which workflow continues to be directed to active data server 1.

As workflow continues to be directed to active data server 1, a determination is made as to whether the maximum load level 30 associated with the active data server 1 is reached (step 110). If determination in step 110 is negative (i.e., the maximum load level 30 of data server 1 has not been reached), the method returns back to step 108 to continue directing workflow to active data server 1. However, if determination in step 110 is affirmative (i.e., the maximum load level 30 of data server 1 has been reached), the method proceeds to step 112.

In step 112, a determination is made as to whether the minimum load level 20 associated with an idle one of the data servers (e.g., data server 2) can be maintained with the actual amount of workflow which is presently being directed to active data server 1. One example of a way to determine if the minimum load level 20 of data server 2 can be maintained is to calculate a value based upon size of a work queue associated with active data server 1 and the rate at which work in the work queue of active data server 1 is being completed. If determination in step 112 is negative (i.e., the minimum load level 20 of data server 2 is unable to be maintained), the method returns back to step 108 to continue directing workflow to active data server 1.

However, if determination in step 112 is affirmative (i.e., the minimum load level 20 of data server 2 can be maintained), the method proceeds to step 114 in which workflow begins to be directed to an idle data server (such as data server 2). Accordingly, data server 2 now becomes an active data server. The method returns back to step 102 to repeat the steps described hereinabove, with both data server 1 and data server 2 now considered being active data servers.

It should be apparent that additional workflow will continue to be directed to only data server 1 and data server 2 until an affirmative determination is made that the minimum load level 20 of yet another idle data server (e.g., data server 3) can be maintained. This affirmative determination occurs when the maximum load level 30 associated with data server 1 has been reached and the maximum load level 30 associated with data server 2 has been reached. One example of a way to determine if the minimum load level 20 of data server 3 can be maintained is to calculate a value based upon size of the work queue in active data server 1, the rate at which work in the work queue of active data server 1 is being completed, size of the work queue in active data server 2, the rate at which work in the work queue of active data server 2 is being completed.

It should also be apparent that as the arrival rate of work continues to increase, new idle data servers continue to be ramped up into operation. As the arrival rate of work levels off, work continues to be directed to only active data servers at that time. As the arrival rate of work begins to decrease, work to an active one of the data servers is reduced and continues to be reduced on this particular active data server until the minimum load level 20 of work to this particular active data server can no longer be maintained. When this occurs, this particular active data no longer accepts any new work and eventually becomes idle.

An intent of the first method shown in FIG. 1 is to utilize an idle data server only if the minimum load level associated with that particular data server can be sustained. If the minimum load level to that particular data server cannot be sustained, then the data server is to be left idle and other active servers will be loaded with this (small) incremental work. It should be noted that loading an idle data server with low loads is not worth the overhead for managing clients that have to connect to the data server to process work. Moreover, unnecessary delays would be incurred when switching between more active data servers. Thus, by not loading an idle data server with low loads, overhead and unnecessary delays are avoided.

Another intent is to fully utilize all data servers during peak-hours of operation and to have surplus servers (i.e., idle servers) during less busy times (when all of the servers are not fully utilized) so that routine maintenance can be performed without having to halt system operation and bring the system down. It should be noted that there needs to be at least one idle data server available before routine maintenance can be performed without having to halt system operation and bring the system down.

Figure 5:
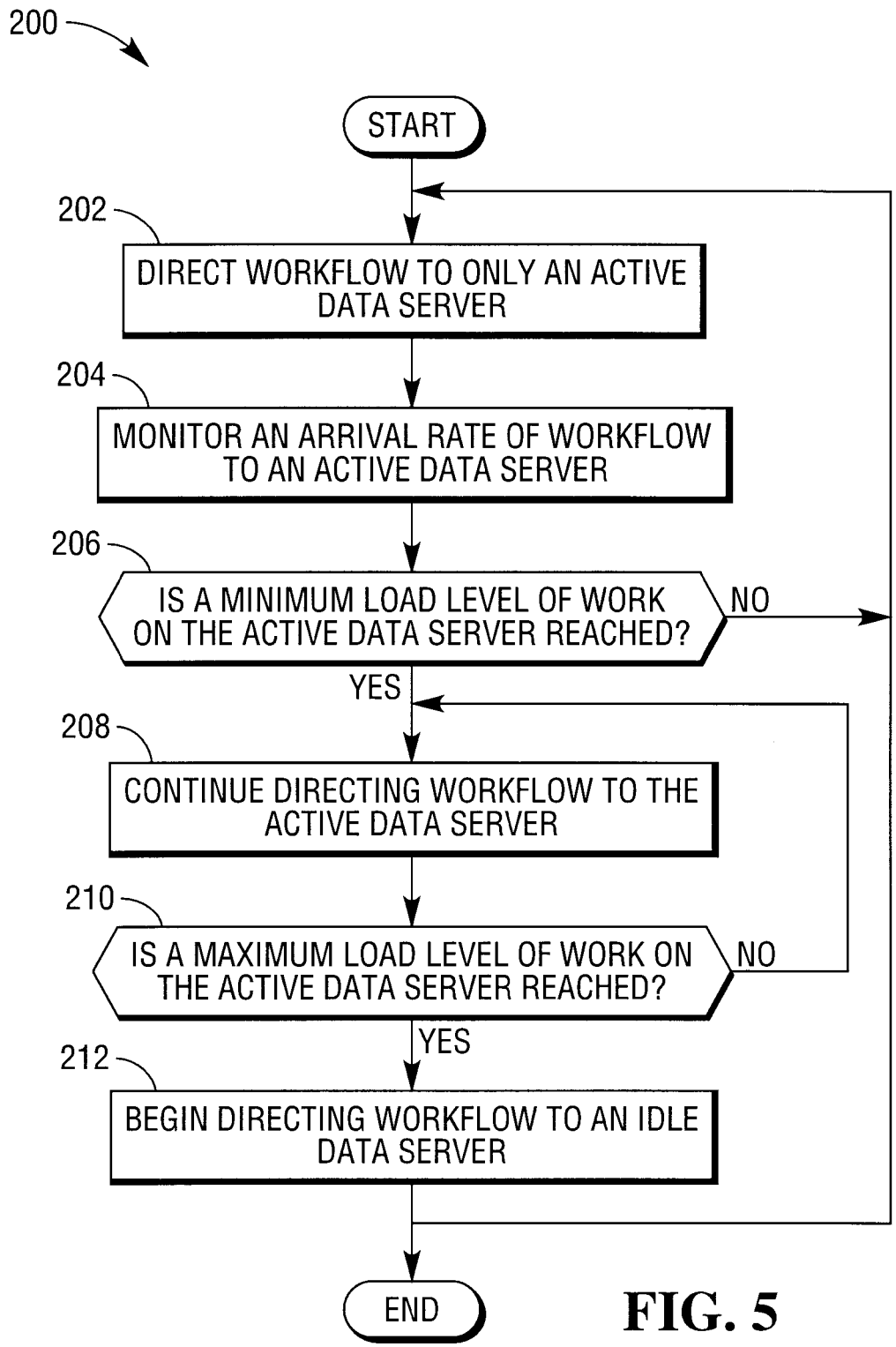
FIG. 5 depicts a flow diagram of one embodiment of another method which may be implemented by the system of FIG. 1.

Referring to FIG. 5, a flow diagram 200 depicts one embodiment of a second method which may be implemented by the system 10 of FIG. 1. This second method is based upon the minimum and maximum load levels 20, 30 shown in FIG. 1 and at least some of the factors shown in the list 50 of FIG. 3, as will be described in detail hereinbelow.

During operation of system 10 of FIG. 1, workflow is directed to only an active one of the data servers 1, 2, 3 . . . N (step 202). For simplicity and purposes of explanation, it will be assumed that data server 1 is initially the only active data server. An arrival rate of workflow to data server 1 is monitored (step 204).

As workflow is directed to active data server 1, a determination is made as to whether the minimum load level 20 associated with the active data server 1 is reached (step 206). If determination in step 206 is negative (i.e., the minimum load level 20 of data server 1 has not been reached), the method returns back to step 202 to continue directing workflow to data server 1. However, if determination in step 206 is affirmative (i.e., the minimum load level 20 of data server 1 has been reached), the method proceeds to step 208 in which workflow continues to be directed to active data server 1.

As workflow continues to be directed to active data server 1, a determination is made as to whether the maximum load level 30 associated with the active data server 1 is reached (step 210). If determination in step 210 is negative (i.e., the maximum load level 30 of data server 1 has not been reached), the method returns back to step 208 to continue directing workflow to active data server 1.

However, if determination in step 210 is affirmative (i.e., the maximum load level 30 of data server 1 has been reached), the method proceeds to step 212 in which workflow begins to be directed to an idle data server (such as data server 2). Accordingly, data server 2 now becomes an active data server. The method returns back to step 202 to repeat the steps described hereinabove, with both data server 1 and data server 2 now considered being active data servers.

It should be apparent that if the arrival rate of workflow increases, the additional workflow will continue to be directed to data server 1 to maintain data server 1 operating at maximum load level 30 and also to data server 2. If the arrival rate of workflow continues to increase, new idle data servers continue to be ramped up into operation. As the arrival rate of work levels off, work continues to be directed to only active data servers at that time.

It should also be apparent that if the arrival rate of workflow begins to decrease, work to an active one of the data servers is reduced and continues to be reduced on this particular active data server until it no longer processes any work. When this occurs, this particular active data no longer accepts any new work and becomes an idle data server. If the arrival rate of workflow continues to decrease, another active data server continues to be ramped down until it no longer processes any work. When this occurs, this particular active data also no longer accepts any new work and becomes an idle data server.

Figure 6:
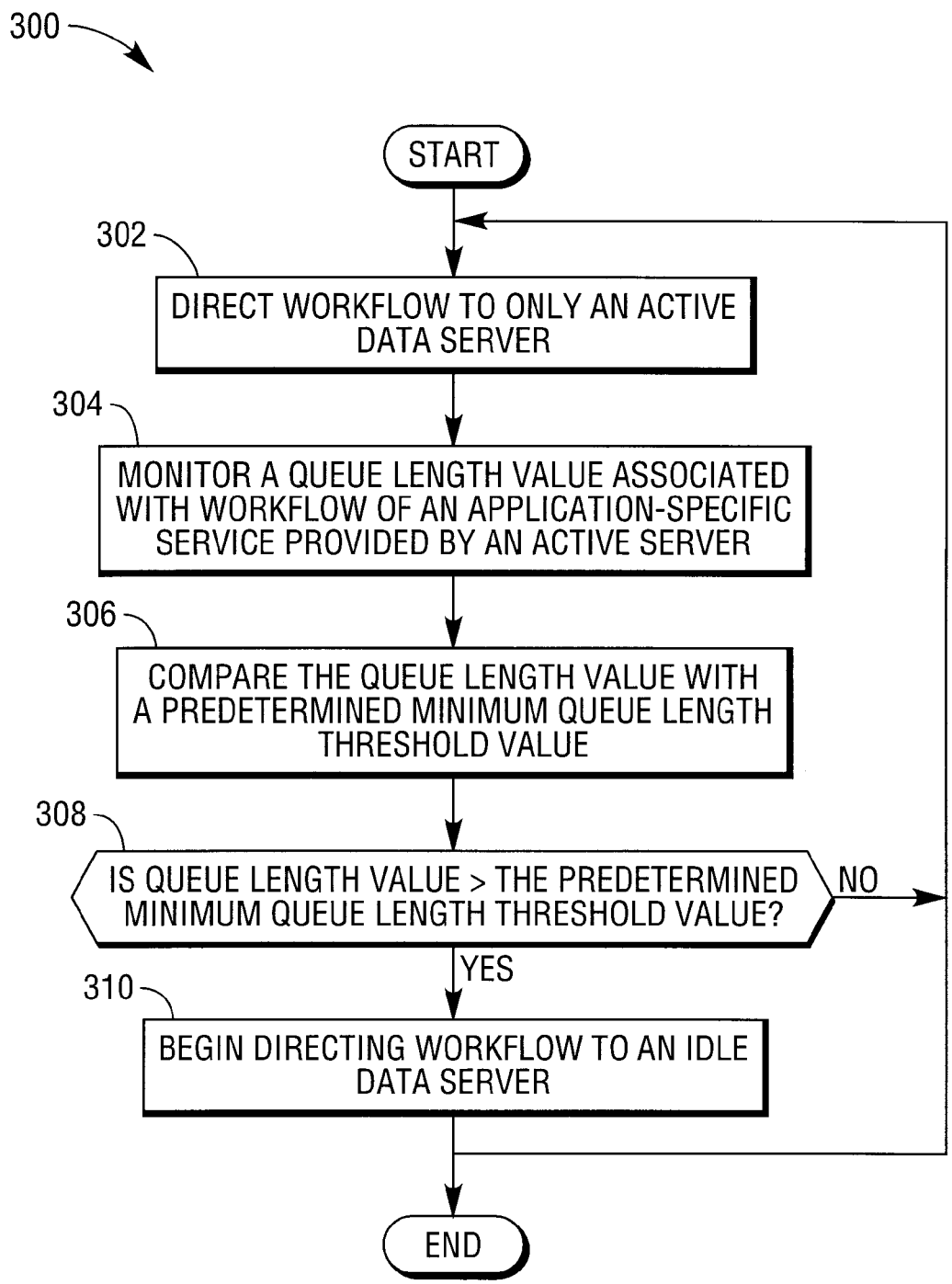
FIG. 6 depicts a flow diagram of one embodiment of a yet another method which may be implemented by the system of FIG. 1.

Referring to FIG. 6, a flow diagram 300 depicts one embodiment of a third method which may be implemented by the system 10 of FIG. 1. This third method is based upon at least some of the factors shown in the list 50 of FIG. 3, as will be described in detail hereinbelow.

During operation of system 10 of FIG. 1, workflow is directed to only an active one of the data servers 1, 2, 3 . . . N (step 302). For simplicity and purposes of explanation, it will be assumed that data server 1 is initially the only active data server. Data server 1 provides an application-specific service and processes workflow associated with this application-specific service. A queue depth value associated with the amount of workflow to data server 1 is monitored (step 304). The queue depth value may comprise a number which represents the amount of work waiting to be processed by active data server 1.

As workflow is directed to active data server 1, the queue depth value monitored in step 304 is compared with a predetermined minimum queue depth threshold value which is stored in a memory (step 306). The predetermined minimum queue depth threshold value is representative of certain amount of work waiting to be processed. A determination is made (step 308) as to whether the monitored queue depth value is greater than the predetermined minimum queue depth threshold value stored in memory. If determination in step 308 is negative (i.e., the queue depth value is not greater than the predetermined minimum queue depth threshold value), the method returns back to step 302 to continue directing workflow to data server 1.

However, if determination in step 308 is affirmative (i.e., the queue depth value is greater than the predetermined minimum queue depth threshold value), the method proceeds to step 310 in which workflow begins to be directed to an idle data server (such as data server 2 if it is idle). Accordingly, data server 2 now becomes an active data server. The method returns back to step 302 to repeat the steps described hereinabove, with both data server 1 and data server 2 now considered being active data servers.

It should be apparent that if workflow increases to data server 1, then the amount of work waiting to be processed at data server 1 increases and, therefore, its queue depth value increases. When the queue depth values increases above the predetermined minimum queue depth threshold value, any additional workflow to data server 1 will be re-routed to an idle data server. Thus, after the amount of work waiting to be processed at data server 1 increases above a certain of amount of work, any additional workflow to data server 1 will be re-routed to an idle data server (such as data server 2 if it is idle). If a queue depth value is also monitored for data server 2 and a predetermined minimum queue depth threshold value is also associated with data server 2, then the above process described hereinabove repeats itself similarly with respect to data server 2.

It should also be apparent that if the amount of work waiting to be processed at data server 1 decreases and its queue depth value decreases below its associated predetermined minimum queue depth threshold value, then any new work to data server 1 will form into the queue for data server 1. New work to data server 1 will continue to form into the queue for data server 1 until its queue depth value exceeds its predetermined minimum queue depth threshold value. When this occurs, new work is re-routed to either an idle data server or another active data server whose queue depth value has not exceeded its associated predetermined minimum queue depth threshold value (such as data server 2 in the example described hereinabove).

The example methods described hereinabove are performed by a computer having a memory executing one or more programs of instructions which are tangibly embodied in a program storage medium readable by the computer. Preferably, a computer associated with the primary control server 11 performs the example methods described hereinabove. However, it is conceivable that one or more computers associated with one or more of the secondary data servers 1, 2, 3 . . . N performs the example methods described hereinabove. It is also conceivable that some other combination of a computer associated with the primary control server 11 and one or more computers associated with one or more of the secondary data servers 1, 2, 3 . . . N performs the example methods described hereinabove.

The example methods described hereinabove provide an intelligent server load leveling feature. This feature may be implemented by a level-loading algorithm which is expressed in a computer program containing executable instructions which, when executed, carry out steps of the algorithm to provide the feature. By providing an intelligent server load leveling feature, there is no longer a need to halt system operation and take the entire system down for maintenance. Data servers can be individually be taken offline for maintenance while other data servers keep running, thereby providing continuous 100% (24×7) availability of the system.

The intelligent server load leveling feature also allows servers to be fully utilized to their capacity. By loading data servers to their maximum load level all the time, there no need to reserve unused capacity on any data server for the purpose of processing an exception condition if an exception condition should happen to occur. Thus, less data servers are needed for the entire system configuration, resulting in less costs.

The intelligent server load leveling feature further enables work to be redirected from one entire system to an alternate system, without any configuration changes, since the logic is dynamic. This is especially useful in the event of a disaster. Recovery efforts would be quick and seamless.

It should be noted that additional loads are automatically spread out amongst active data servers. This may eliminate the need for a client to require an entire backup system on cold standby in case of a disaster. Instead, just add capacity to existing systems. Accordingly, less hardware would be required, resulting in less costs.

It should also be noted that data servers can dynamically be added or removed from the configuration without having to reconfigure the loading profile (i.e., the computer program(s) which expresses the level-loading algorithm), because the level-loading algorithm automatically detects added data servers (or removed data servers) and adjusts accordingly. This enables easy redeployment of old data servers, or gradual integration of new data servers because the level-loading algorithm detects and monitors the dynamic condition of each data server's individual capacity to process work.

It should further be noted that application-specific conditions which impact performance of a data server or overall solution performance/throughput can be factored into the level-loading algorithm to distribute the load to each data server in a manner more ideal for the specific application.

While the present invention has been illustrated by the description of example processes and system components, and while the various processes and components have been described in detail, applicant does not intend to restrict or in any limit the scope of the appended claims to such detail. Additional modifications will also readily appear to those skilled in the art. The invention in its broadest aspects is therefore not limited to the specific details, implementations, or illustrative examples shown and described. Accordingly, departures may be made from such details without departing from the spirit or scope of applicant's general inventive concept.

What is claimed is:

1. A method of controlling workflow loads on a plurality of secondary data server computers, implemented by a primary control server computer in communication with the secondary data server computers, the method comprising:
   initially directing workflow over a network to only an active first data server computer of the plurality of secondary data server computers;
   calculating at least one server capacity factor associated with the active first data server computer;
   after a first predetermined minimum load level of work to the active first data server computer has been reached, continue directing work to only the active first data server computer until a first predetermined maximum load level of work to the active first data server computer is reached;
   after the predetermined maximum load level of work to the active first data server computer is reached, determining, based upon the calculated capacity factor associated with the active first data server computer, if a second predetermined minimum load level of work can be maintained on an idle second data server computer of the plurality of secondary data server computers while still maintaining the first predetermined minimum load level of work on the active first data server computer if workflow is directed to the idle second data server computer; and
   directing workflow to the idle second data server computer when a determination is made that the second predetermined minimum load level of work can be maintained on the idle second data server computer only after the first predetermined maximum load level of work to the active first data server computer is reached and the arrival rate of workflow to the active first data server computer exceeds a predetermined arrival rate value.

2. A method according to claim 1, further comprising:
   monitoring an arrival rate of workflow to the active first data server computer.

3. A method according to claim 1, wherein the at least one capacity factor comprises (i) size of a work queue associated with the active first data server computer, and (ii) rate at which work in the work queue is being completed.

4. A method according to claim 1, wherein the at least one capacity factor comprises (i) central processor unit (CPU) utilization associated with the active first data server computer, and (ii) disk capacity associated with the active first data server computer.

5. A method according to claim 1, wherein the at least one capacity factor comprises a daily maximum work volume expected to be performed.

6. A method according to claim 1, wherein the method is performed by the primary control server computer having a memory executing one or more programs of instructions which are tangibly embodied in a non-transitory program storage medium readable by the computer.

7. A method of controlling workflow loads on a plurality of secondary data server computers, implemented by a primary control server computer in communication with the secondary data server computers, the method comprising:
   initially directing workflow to only a first data server computer of the plurality of secondary data server computers;
   computing an arrival rate of workflow to the first data server computer;
   after a first predetermined minimum load level of work to the first data server computer has been reached, continue directing work to the first data server computer until a first predetermined maximum load level of work to the first data server computer is reached; and
   directing workflow from the first data server computer to a second data server computer of the plurality of secondary data server computers only after the first predetermined maximum load level of work to the first data server computer is reached based on the computed arrival rate of workflow to the first data server computer and the arrival rate of workflow to the first data server computer exceeds a first predetermined arrival rate value which indicates an arrival workflow rate sufficient to maintain the first predetermined minimum load level of work to the first data server computer and a second predetermined minimum load level of work to the second data server computer.

8. A method according to claim 7, further comprising:
   determining an arrival rate of workflow to the second data server computer;
   after the second predetermined minimum load level of work to the second data server computer has been reached, continue directing work to the second data server computer until a second predetermined maximum load level of work to the second data server computer is reached; and
   directing workflow from the second data server computer to a third data server computer of the plurality of secondary data server computers after the second predetermined maximum load level of work to the second data server computer is reached and the arrival rate of workflow to the second data server computer exceeds a second predetermined arrival rate value which indicates an arrival rate of workflow sufficient to maintain the second predetermined minimum load level of work to the second data server computer and a third predetermined minimum load level of work to the third data server computer.

9. A method according to claim 8, further comprising:
   taking offline any idle data server computers of the plurality of secondary data server computers when a maintenance request is received so that maintenance can be performed on the idle data server computers that have been taken offline.

10. A method according to claim 9, further comprising:
    after maintenance has been performed on the idle data server computers which have been taken offline, transitioning loads from active data server computers to the idle data server computers so that the previously active data server computers can be taken offline later to perform maintenance on these data server computers.

11. A method according to claim 9, wherein the method is performed by the primary control server computer having a memory executing one or more programs of instructions which are tangibly embodied in a non-transitory program storage medium readable by the computer.

* * * * *